US010493889B2

(12) United States Patent
Soltner et al.

(10) Patent No.: US 10,493,889 B2
(45) Date of Patent: Dec. 3, 2019

(54) RACK AND ITS METHOD OF MANUFACTURE, HEADREST COMPRISING SUCH A RACK, AND SEAT COMPRISING SUCH A HEADREST

(71) Applicant: Faurecia Sièges d'Automobile, Nanterre (FR)

(72) Inventors: Stephane Soltner, Mailleroncourt Charette (FR); Francois Lelievre, Orleans (FR); Franck Ganuchaud, Tierce (FR)

(73) Assignee: Faurecia Sièges d'Automobile, Nanterre (FR)

( * ) Notice: Subject to any disclaimer, the term of this patent is extended or adjusted under 35 U.S.C. 154(b) by 94 days.

(21) Appl. No.: 15/661,894

(22) Filed: Jul. 27, 2017

(65) Prior Publication Data
US 2018/0029509 A1   Feb. 1, 2018

(30) Foreign Application Priority Data
Jul. 27, 2016   (FR) ..................................... 16 57240

(51) Int. Cl.
*B60N 2/818* (2018.01)
(52) U.S. Cl.
CPC .................................. *B60N 2/818* (2018.02)
(58) Field of Classification Search
CPC ..................................................... B60N 2/818
See application file for complete search history.

(56) References Cited

U.S. PATENT DOCUMENTS

| | | | |
|---|---|---|---|
| 4,696,406 A | 9/1987 | Karashima | |
| 6,460,931 B2* | 10/2002 | Beck | B60N 2/20 297/410 |
| 7,410,219 B2* | 8/2008 | Kraft | B60N 2/809 297/410 |
| 9,022,471 B2* | 5/2015 | Gaudreau, Jr. | B60N 3/101 297/216.11 |
| 9,415,707 B2* | 8/2016 | Bohm | B60N 2/2851 |
| 2010/0264705 A1* | 10/2010 | Karremans | B60N 2/2812 297/250.1 |
| 2012/0153690 A1* | 6/2012 | Gaudreau, Jr. | B60N 2/2821 297/250.1 |

(Continued)

FOREIGN PATENT DOCUMENTS

FR   2987792 A1   9/2013
FR   3010951 A1   3/2015

OTHER PUBLICATIONS

French Search Report and Written Opinion in French for application No. FR1657240, dated Mar. 14, 2017, 7 pages.

*Primary Examiner* — Philip F Gabler
(74) *Attorney, Agent, or Firm* — Reising Ethington P.C.

(57) ABSTRACT

A rack of molded plastic having a series of notches open in a first direction, each notch having a certain width in a second direction perpendicular to the first direction. The notches are aligned in a third direction perpendicular to the first and second directions, and each notch is defined by a bottom and by first and second side walls extending in the first direction from the bottom to a mouth of the notch. A rib projects into each notch from the first side wall, and the bottom of the notch has a through-opening arranged in correspondence with the rib.

12 Claims, 8 Drawing Sheets

(56) References Cited

U.S. PATENT DOCUMENTS

| | | | |
|---|---|---|---|
| 2012/0242127 A1* | 9/2012 | Gaudreau, Jr. | B60N 2/2812 |
| | | | 297/250.1 |
| 2015/0298372 A1* | 10/2015 | Bielsa | B60N 2/80 |
| | | | 297/391 |
| 2016/0288676 A1* | 10/2016 | Lelievre | B29C 45/14467 |
| 2018/0029509 A1* | 2/2018 | Soltner | B60N 2/818 |
| 2018/0065523 A1* | 3/2018 | Soltner | B60N 2/812 |

* cited by examiner

RACK AND ITS METHOD OF MANUFACTURE, HEADREST COMPRISING SUCH A RACK, AND SEAT COMPRISING SUCH A HEADREST

TECHNICAL FIELD

The present invention relates to racks, headrests comprising such racks, and seats comprising such headrests.

BACKGROUND

Document FR3010951 discloses a rack of molded plastic, comprising a series of notches open in a first direction, each notch having a certain width in a second direction substantially perpendicular to the first direction, said notches being aligned in a third direction substantially perpendicular to the first and second directions, and each notch being defined by a bottom and by first and second side walls extending in the first direction from the bottom to a mouth of the notch.

Such racks are used in particular for adjusting the height of headrests, where a portion of the headrest slides along the rack and can be locked in position by engaging a locking member (wire or other) in one of the notches of the rack.

Demolding constraints sometimes require creating the notches with some flaring towards their mouth, such that the metal wire can sometimes jump from one notch to another in the event of an accident or when the wire is placed in the locking position while the headrest is being moved vertically. This effect may possibly be permitted or even desired in one direction, for example when moving the headrest upwards; however, it is not permitted in the opposite direction, for example when moving the headrest downwards, as this can be dangerous for the user or at least results in inaccuracy in the height adjustment of the headrest.

SUMMARY

An object of the invention is to overcome the above-noted disadvantages.

To this end, according to an aspect of the invention, a rack of the type in question is characterized in that it further comprises, for each notch, a rib projecting into the notch from at least the first side wall, said rib extending from the bottom to the mouth of the notch and having an edge facing the second side wall, said edge being substantially perpendicular to the third direction, and in that the bottom of the notch comprises at least one through-opening arranged in correspondence with said rib.

By virtue of these arrangements, it is possible to mold the additional rib by a mold portion passing through the opening in the bottom of the notch, meaning from the rear of the rack. It is thus possible to create notches in which the rib arranged on the first side wall contributes to the proper retention of the locking member in the notch.

In various embodiments of the rack according to the invention, one or more of the following arrangements may possibly be used:
said rib is present on only a portion of the width of the notch;
the edge of the rib forms, with the third direction, an angle comprised between 80 and 90 degrees, preferably between 88 and 90 degrees;
said rib extends towards the mouth of the notch while converging with the second side wall;
all the first side walls have the same orientation along the third direction;
the edge of the rib is substantially rectilinear.

The invention also relates to a headrest comprising a head support part mounted so as to be movable along at least one rack as defined above in order to travel upwards and downwards, the head support part comprising a locking member adapted to selectively engage the notches of said rack.

In various embodiments of the headrest according to the invention, one or more of the following arrangements may possibly be used:
the first side walls of the notches are located at the top of each notch;
the locking member is a metal wire extending in the second direction.

The invention also relates to a vehicle seat comprising a headrest as defined above.

Finally, another object of the invention is a method for manufacturing a rack as defined above by molding in a mold having first and second parts, the first and second side walls and the bottom of each notch being molded by the second mold part and the rib being at least partially molded by the first mold part, and said first mold part is removed from each notch through the opening in the bottom of the notch during demolding.

BRIEF DESCRIPTION OF DRAWINGS

Other features and advantages of the invention will be apparent from the following description of an embodiment given by way of non-limiting example, with reference to the accompanying drawings.

In the drawings.

DETAILED DESCRIPTION

In the various figures, the same reference numbers designate identical or similar elements.

For the sake of clarity, only those elements useful to understanding the described embodiments have been represented and will be detailed.

In the following description, when referring to absolute position qualifiers such as the terms "front", "back", "top", "bottom", "left", "right", etc., or relative qualifiers such as the terms "above", "below", "upper", "lower", etc., or to orientation qualifiers, these are in reference to a seat, and in particular to a headrest, in a normal position of use in the ordinary direction of travel of the vehicle.

Figure 1:
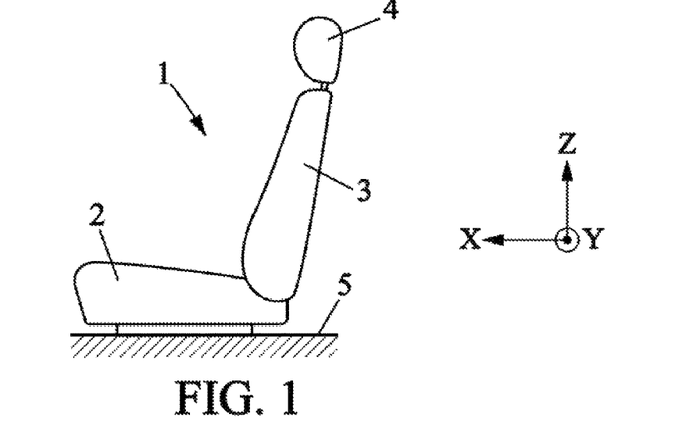
FIG. 1 is a schematic view of a vehicle seat that can be equipped with a headrest according to an embodiment of the invention.

FIG. 1 represents a seat 1 of a motor vehicle having a seating part 2 for receiving an occupant of the seat 1 and a backrest 3 supporting a headrest 4. The seating part 3 is mounted on the floor 5 of the vehicle.

Figure 2:
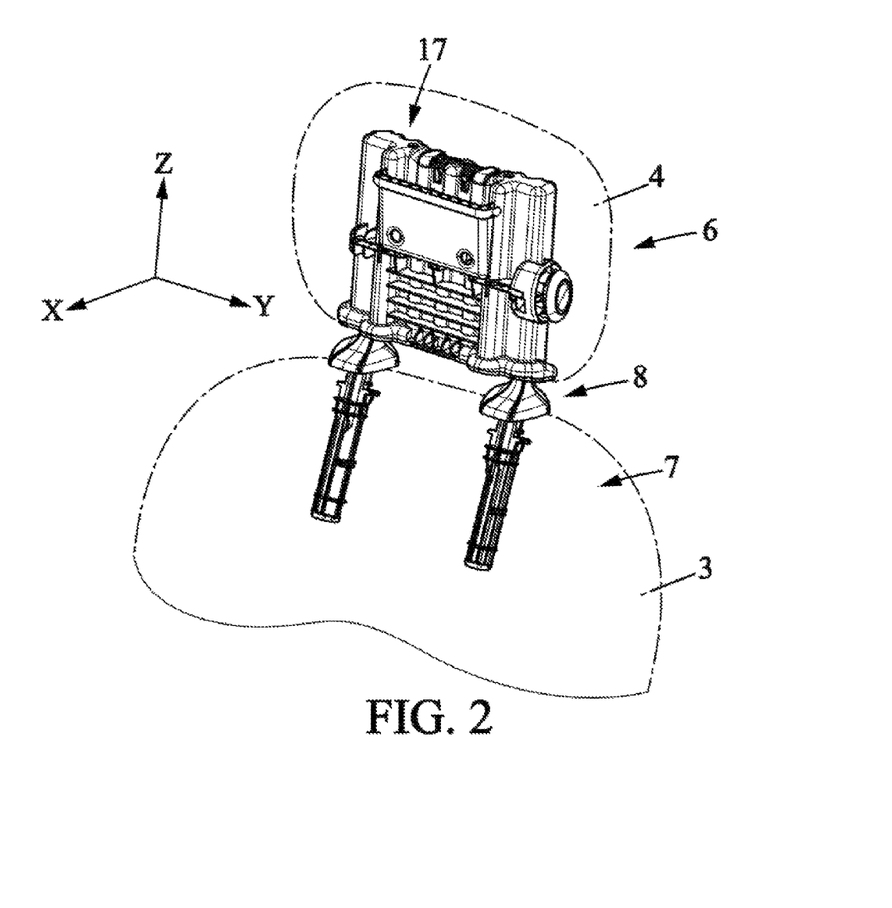
FIG. 2 is a perspective view of a portion of the frame of the seat backrest and the frame of the headrest.

The headrest 4 more specifically comprises a headrest assembly 6. As illustrated in FIG. 2, the headrest assembly 6 may be connected to a backrest frame 7.

The headrest assembly 6 is connected to the backrest 2 by means of a support structure 8. The support structure 8 may comprise at least one pin 9a, 9b. In the embodiment shown in the figures, the support structure 8 comprises two pins 9a, 9b parallel to one another, extending in a substantially vertical direction of adjustment Z.

Figure 3:
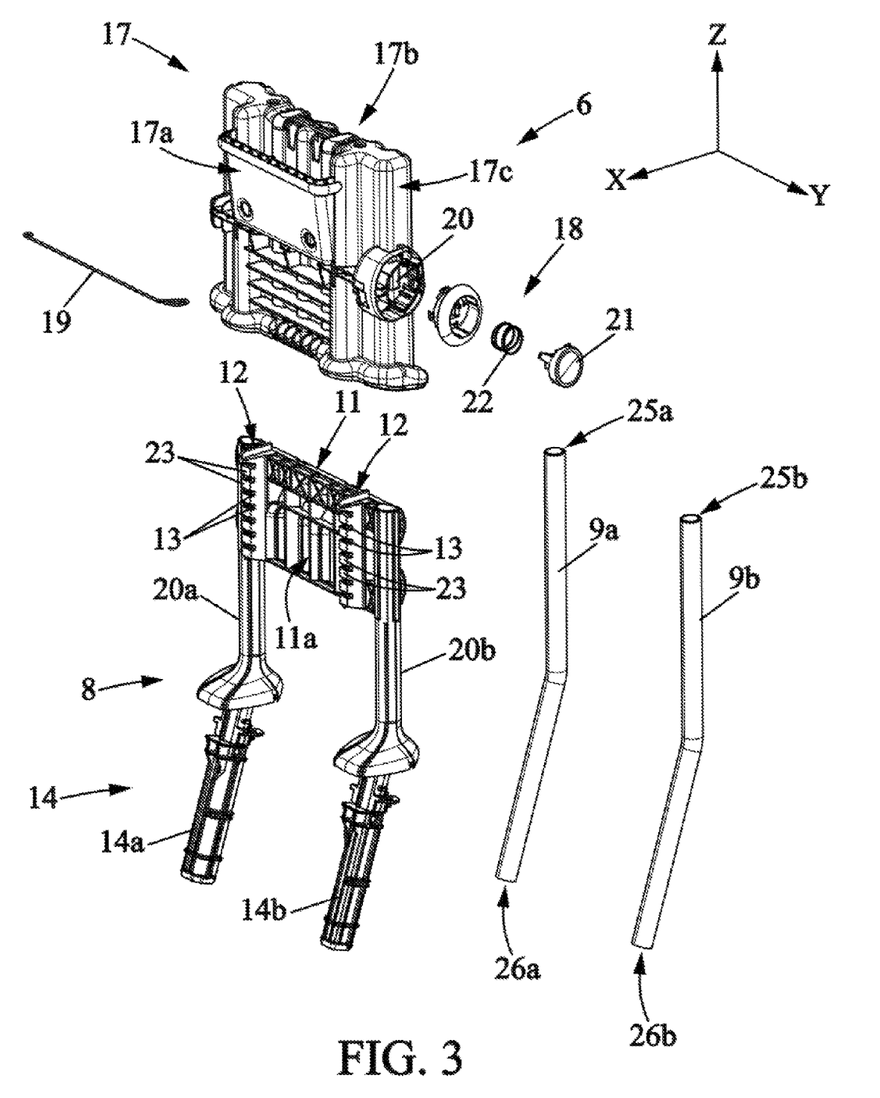
FIG. 3 is an exploded perspective view of the frame of the headrest of FIG. 2, in particular comprising a plate and a head support piece that is mounted so as to slide vertically on the plate.
Figure 4:
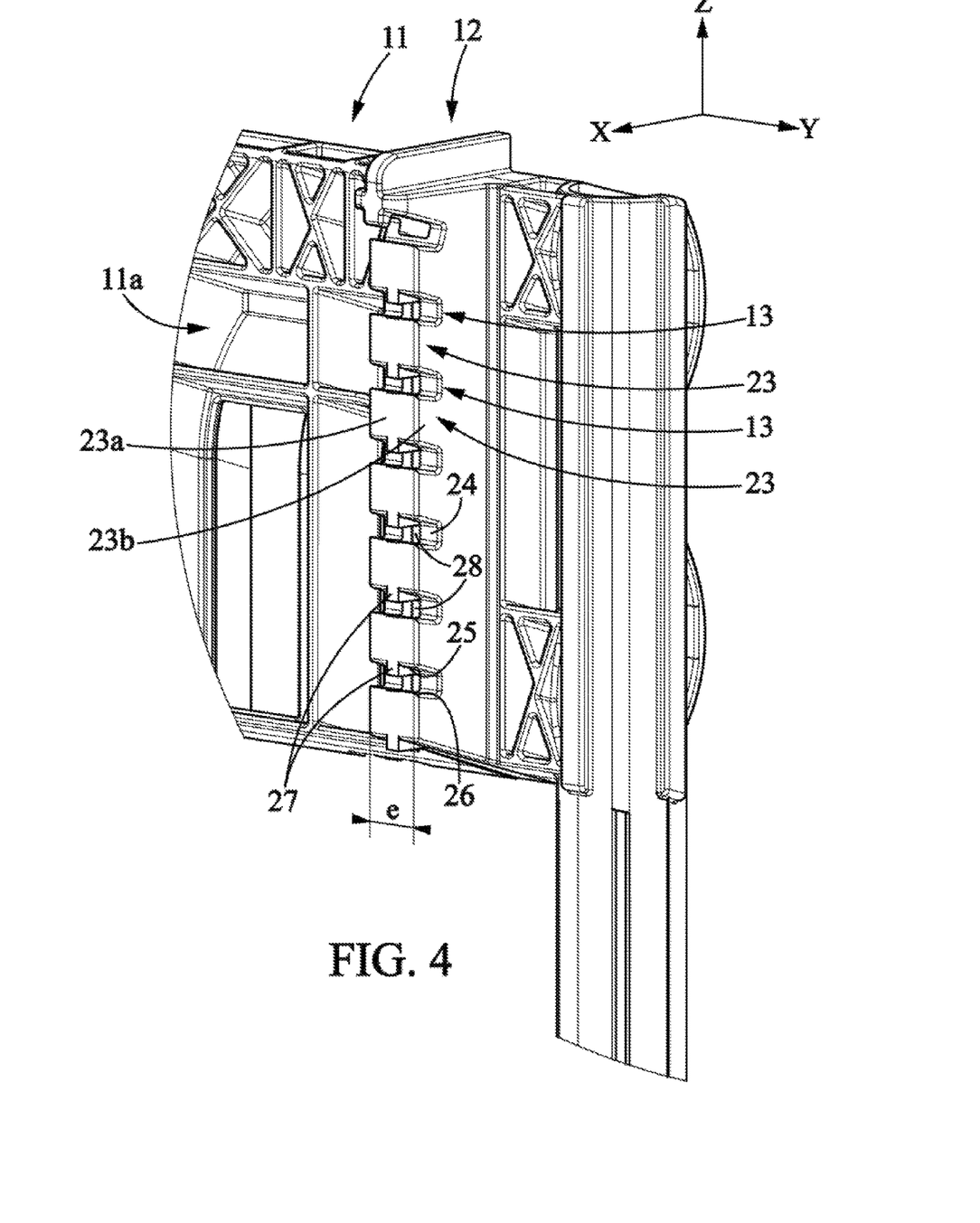
FIG. 4 is an enlarged view of a portion of the plate of FIG. 3.

As can be seen in FIG. 3, the two pins 9a, 9b may have a generally cylindrical external cross-section. The two pins 9a, 9b are preferably of metal, but may be of another material, such as plastic for example or other material. The two pins 9a, 9b extend respectively between an upper end 25a, 25b and a lower end 26a, 26b.

The support structure 8 further comprises an adjustment plate 11. The adjustment plate 11 is, for example, a substantially rectangular plate having a front face 11a and a rear face 11b. The adjustment plate 11 may be molded of plastic. The adjustment plate 11 extends in a transverse direction Y between the pins 9a, 9b. The transverse direction is a horizontal direction perpendicular to direction Z. The adjustment plate 11 may present a generally flat shape having a midplane YZ substantially perpendicular to a longitudinal direction X corresponding for example to the direction of advancement of the vehicle.

The adjustment plate 11 is secured to the pins 9a, 9b; it may in particular be fixed to the upper ends 25a, 25b of the pins 9a, 9b.

The front face 11a of the adjustment plate 11 comprises at least one rack 12, and in the embodiment represented two racks 12, each comprising notches 13 aligned along direction Z. The notches 13 are open towards the front in direction X and are separated by teeth 23.

The headrest assembly 6 also comprises a support structure 17, which is a part serving to support the head of the seat occupant. The support structure 17 may be molded of plastic. The support structure 17 comprises a front face 17a, in particular suitable for supporting the head of an occupant of the seat 1, and a rear face 17b. The support structure 17 also comprises two side faces 17c respectively comprised between the front face 17a and the rear face 17b. The support structure 17, in particular the front and rear faces 17a, 17b, may be covered with padding and/or a protective cover represented in phantom outline in FIG. 2. A seat occupant can thus rest his or her head against the front face 17a of the support structure 17 when the occupant is sitting on the seat 1.

The support structure 17 is mounted on the adjustment plate 11 so as to be movable in translation in the adjustment direction Z. The support structure 17 thus makes it possible to adjust the position of the headrest 4 upwards and downwards with respect to the backrest 2.

In order to lock the position of the support structure 17 relative to the adjustment plate 11, the headrest assembly 6, in particular the support structure 17, may also comprise a locking system 18.

The locking system 18 comprises at least one locking wire 19, in particular a metal wire which extends transversely along the Y axis. The locking wire 19 is supported and guided by the support structure 17. The locking wire may have a diameter, for example, of between 1.5 and 1.6 mm.

The support structure 17 and in particular its side face 17c may comprise an operating button 21. The operating button 21 is connected to the locking wire 19 by means of a cylindrical opening 20 arranged in the side face 17c of the support structure 17. A user of the seat 1 can actuate the operating button 21 from a locked position to an unlocked position, by pushing it in.

In the locked position, the locking wire 19 engages with at least one notch 13 of each rack 12 of the adjustment plate 11 to prevent translational movement of the support structure 17 along the adjustment direction Z, at least in one direction (in particular upwards).

In the unlocked position, the locking wire 19 allows translational movement of the support structure 17 along the adjustment direction Z. It is then possible to adjust the position of the headrest 4, and in particular the position of the support structure 17, with respect to the backrest 2. A return member 22, for example a spring, resiliently biases the operating button 21 towards the locked position.

Such a locking system 18 is known per se and will not be described in more detail. By way of example, document FR 13 59125 describes for example a height adjustable headrest comprising a locking system for selectively locking and unlocking the support structure 17 of the headrest 4.

The support structure 8 also comprises at least one mounting portion 14, and in the embodiment represented two mounting portions 14a, 14b. More particularly, the mounting portions 14a, 14b are fixed to the lower ends 26, 26b of the pins 9a, 9b.

The mounting portion 14 represented in FIG. 3 comprises for example a first sheath 14a and a second sheath 14b which are respectively fixed around the pins 9a, 9b. The first and second sheaths 14a, 14b respectively surround the lower ends 26a, 26b of the pins 9a, 9b. Each of the first and second sheaths 14a, 14b is formed by a tubular body having an axis along the adjustment direction Z. Each of the first and second sheaths 14a, 14b also comprises a circular or square cross-section. The first and second sheaths 14a, 14b are preferably identical to one another.

The mounting portion 14, in particular each of the first and second sheaths 14a, 14b, is adapted to be arranged in housings, such as sockets provided in the backrest frame 7, or is adapted to be fixed directly to the backrest 3. It is thus possible to mount the support structure 8 in a fixed manner on the backrest 2 as shown in FIG. 2.

The support structure 8 further comprises a covering portion 20, and in the represented embodiment two covering portions 20a, 20b. In particular, each of the covering portions 20a, 20b covers a pin 9a, 9b between the adjustment plate 11, in particular at the upper end 25a, 25b of the pins 9a, 9b, and the mounting portion 14, in particular at lower ends 26a, 26b of the pins 9a, 9b. The covering portions 20a, 20b therefore at least partially cover the pins 9a, 9b.

Further reference is now made particularly to the racks 12 which are clearly visible in FIGS. 4 to 7. Each notch 13 of each rack 12 has a certain transverse width along the Y axis and is defined by a bottom 24, a first side wall 25 at the top, and a second side wall 26 at the bottom. The side walls 25, 26 extend in the X direction from the bottom 24 to a mouth 13a of the notch.

For technical reasons dictated by the process of molding the adjustment plate 11, the side walls 25, 26 generally diverge towards the mouth 13a of the notch 13.

In order to prevent the wire 19 from unintentionally leaving a notch 13 when in the locked position, for example when an upward force is applied to the support structure 17 (for example in the event of an accident), each notch 13 also has, towards the mouth 13a of the notch, at least one rib 27 projecting downwards into the notch 13 from the first side wall 25 of the notch. In order for the rack 12 to remain moldable, it is further provided that the bottom 24 of the notch 13 has a through-opening 28 arranged in correspondence with said rib 27.

Figure 6:
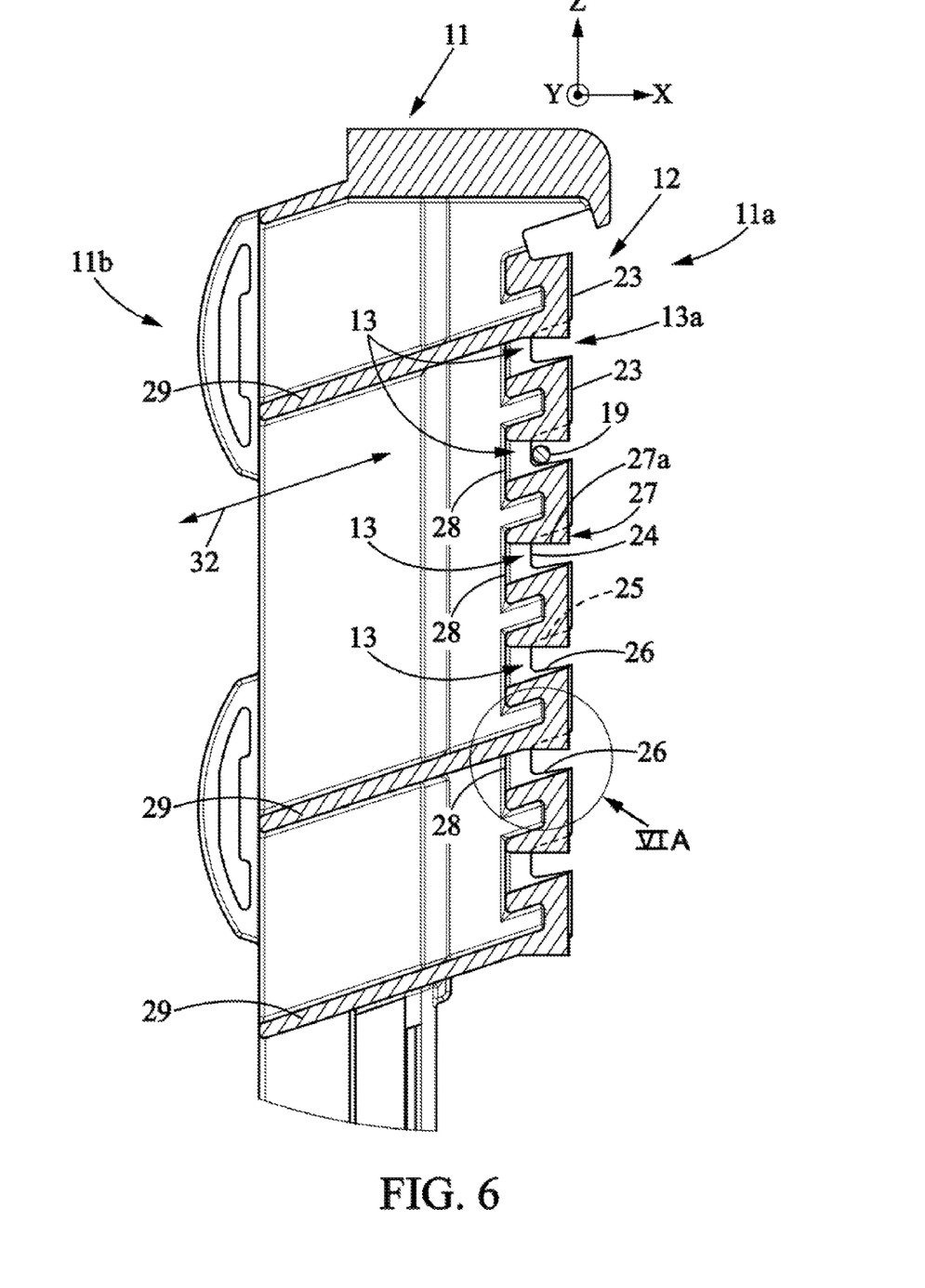
Figure 6A:
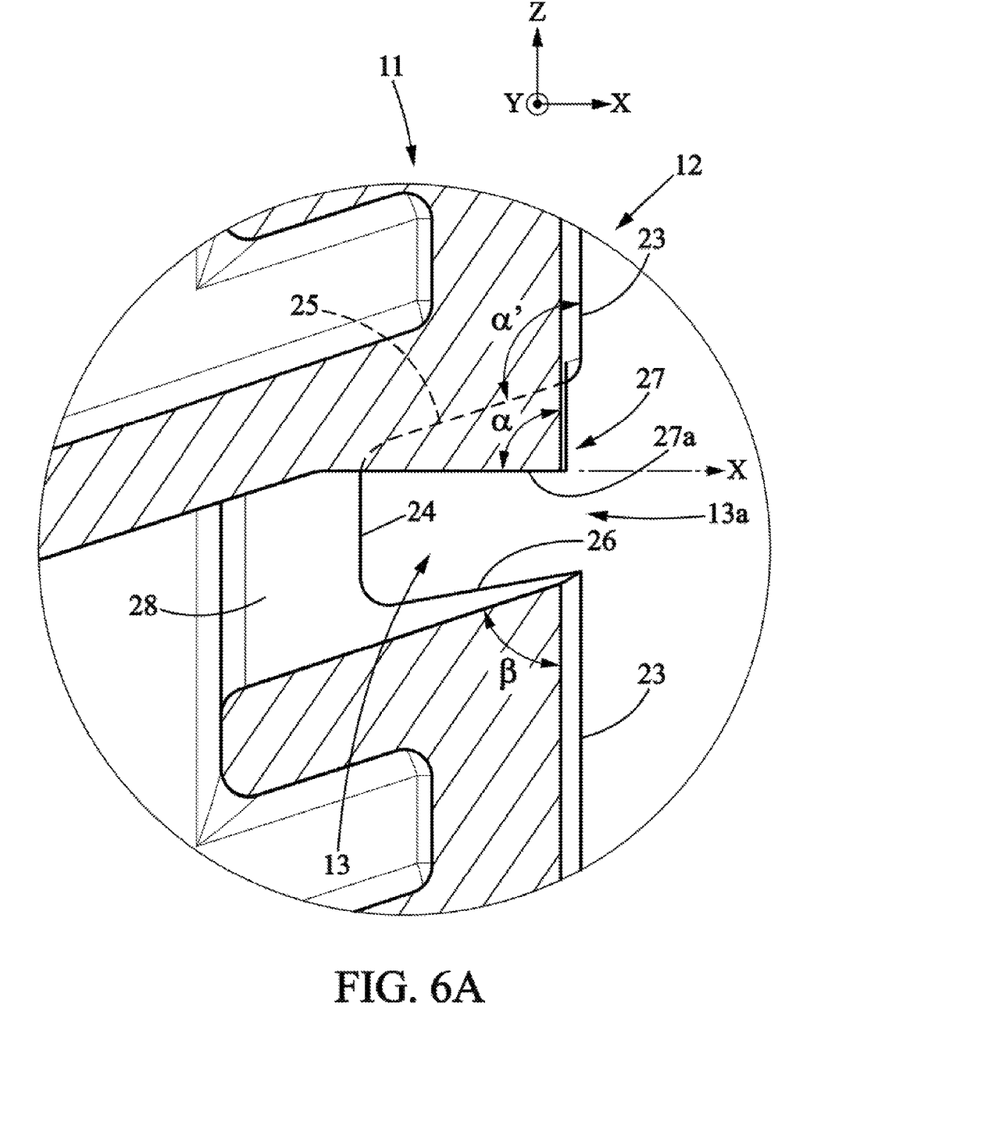
FIG. 6A shows an enlarged detail view of A of FIG. 6.
Figure 7:
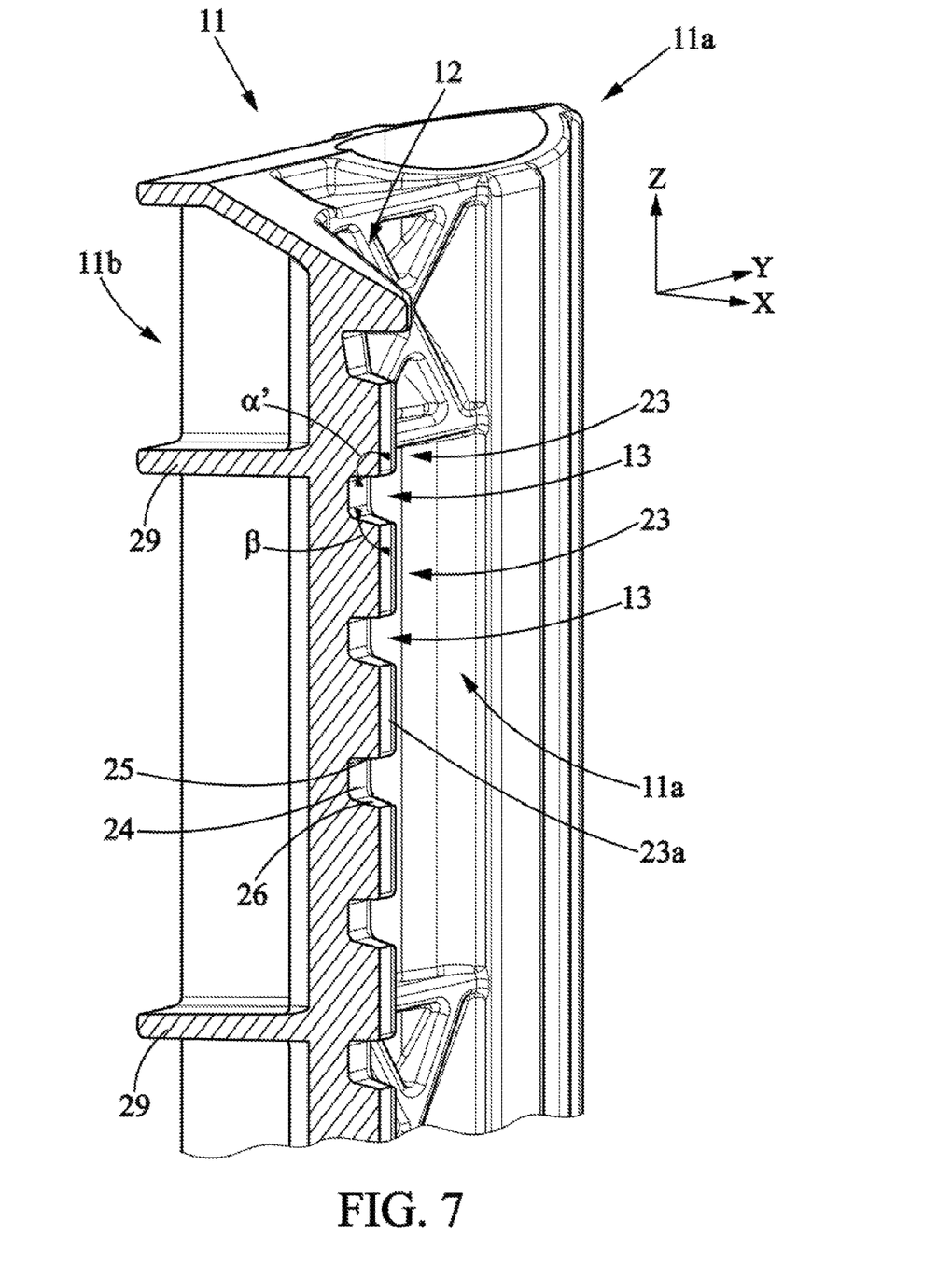

The rib 27 extends from the bottom 24 to the mouth 13*a* of the notch and has a lower edge 27*a* facing the second side wall 26, said edge 27*a* being substantially perpendicular to the third direction Z. More specifically, the edge 27*a* of the rib may be rectilinear. This edge 27*a* may form with direction Z an angle α (measured between the edge 27*a* and direction Z, from the solid side of the rib and rearward towards a reference line parallel to the Z axis, the rearward direction being defined by the rear face 11*b* of the adjustment plate) of between 80 and 90 degrees, advantageously between 88 and 90 degrees.

By way of comparison, the similar angle α' of the first side wall 25 (measured between the side wall 25 and direction Z, from the solid side of the corresponding tooth 23 and rearward towards a reference line parallel to the Z axis) may for example be between 90 and 100 degrees.

Due to the rib 27, even when an upward force is applied to the support structure 17 the wire 19 is held in the notch by the rib 27.

Figure 5:
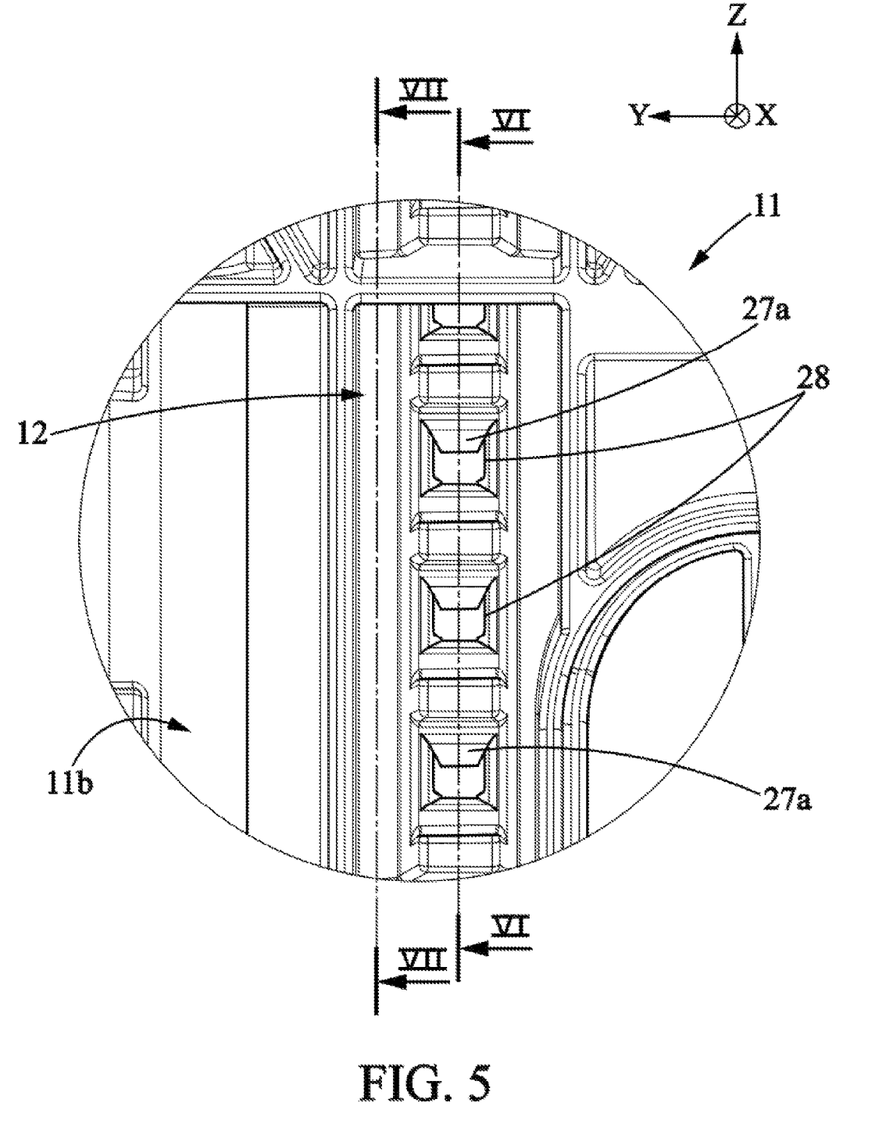
FIG. 5 is a partial rear view of the plate of FIG. 4, FIGS. 6 and 7 are cross-sectional views respectively along lines VI-VI and VII-VII of FIG. 5.

Advantageously, the rib 27 is present over only a portion of the width e of the notch 13, for example substantially towards the center of this width e along the Y axis.

Said rib 27 may extend towards the mouth 13*a* of the notch while converging with the second side wall 26. This is possible when the second side wall 26 forms an angle β with direction Z (measuring the angle β from the solid side of the corresponding tooth 23 and rearward towards a reference line parallel to the Z axis), which may be between 70 and 90 degrees, for example about 80 degrees.

The adjustment plate may possibly have ribs 29 on its rear face 11*b*.

Figure 8:
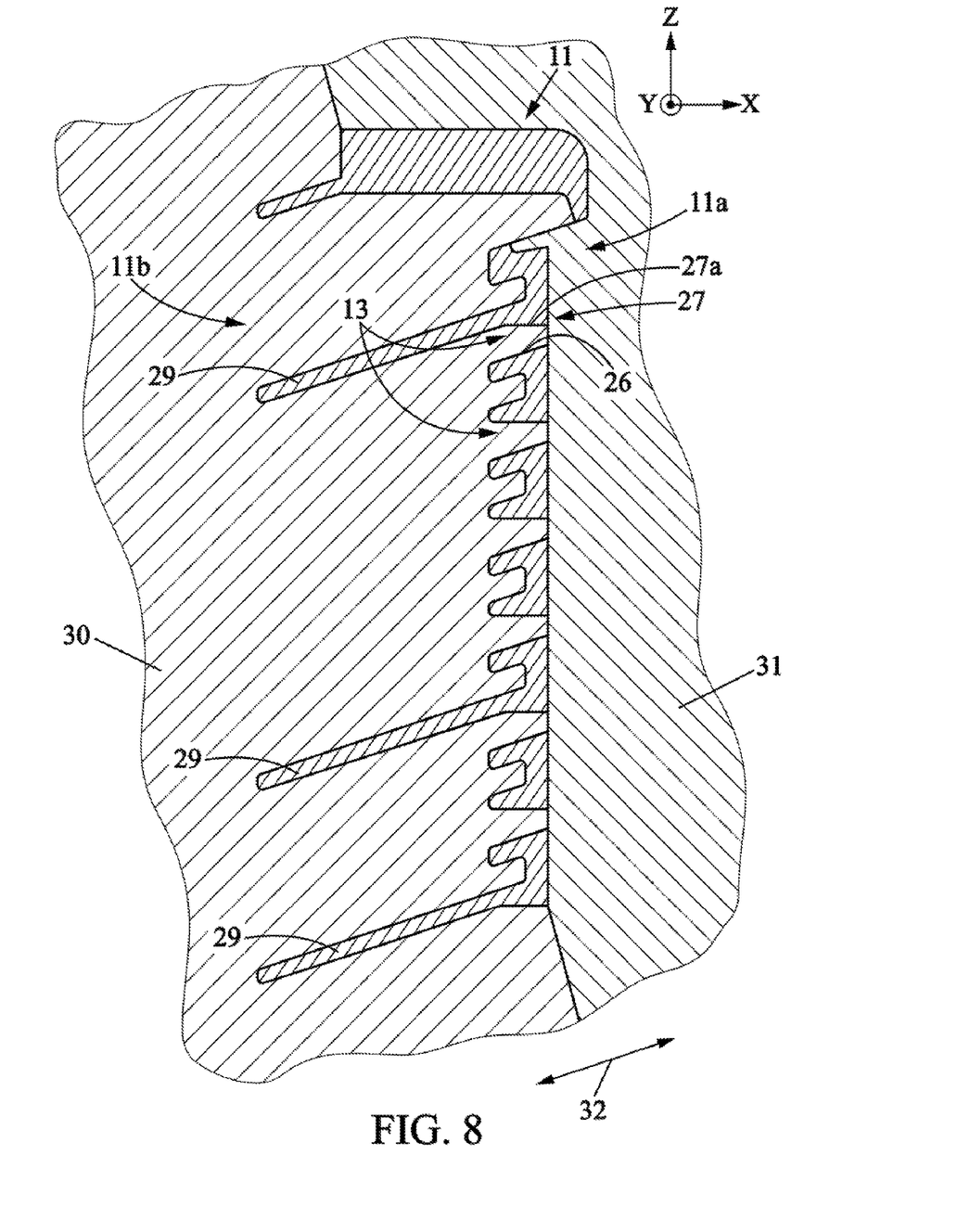
FIG. 8 illustrates the method for manufacturing the plate by molding.

During molding of the adjustment plate 11, as illustrated in FIG. 8, conventionally a mold is used having two parts 30, 31 which are movable relative to one another in a direction 32 which here may be parallel to ribs formed at the back of the adjustment plate 11.

The side walls 25, 26 and the bottom 24 of the notch 13 can be molded by the second mold part 31 (positioned at the front), while the rib 27 can be at least partially molded by the first mold part 30 (located at the back). When the plate 11 is removed from the mold, the first mold part 30 exits the notch 13 in direction 32, through the opening 28 at the bottom of the notch.

The invention claimed is:

1. A rack of molded plastic, comprising a series of notches open in a first direction, each notch having a certain width in a second direction substantially perpendicular to the first direction, said notches being aligned in a third direction substantially perpendicular to the first and second directions, and each notch being defined by a bottom and by first and second side walls extending in the first direction from the bottom to a mouth of the notch, wherein said rack further comprises, for each notch, a rib projecting into the notch from at least the first side wall, said rib extending from the bottom to the mouth of the notch up to the mouth of the notch and having an edge facing the second side wall, said edge being substantially perpendicular to the third direction; and wherein the bottom of the notch comprises at least one through-opening which opens in correspondence with said rib.

2. The rack according to claim 1, wherein said rib is present on only a portion of the width of the notch.

3. The rack according to claim 1, wherein the edge of the rib forms, with the third direction, an angle comprised between 80 and 90 degrees.

4. The rack according to claim 1, wherein the edge of the rib forms, with the third direction, an angle comprised between 88 and 90 degrees.

5. The rack according to claim 1, wherein said rib extends towards the mouth of the notch while converging with the second side wall.

6. The rack according to claim 1, wherein all the first side walls have the same orientation along the third direction.

7. The rack according to claim 1, wherein the edge of the rib is substantially rectilinear.

8. A headrest comprising a head support part mounted so as to be movable along at least one rack according to claim 1 in order to travel upwards and downwards, the head support part comprising a locking member adapted to selectively engage the notches of said rack.

9. The headrest according to claim 8, wherein the first side walls of the notches are located at the top of each notch.

10. The headrest according to claim 8, wherein the locking member is a metal wire extending in the second direction.

11. Vehicle A vehicle seat comprising the headrest according to claim 8.

12. A method for manufacturing the rack according to claim 1, by molding in a mold having first and second parts, the first and second side walls and the bottom of each notch being molded by the second mold part and the rib being at least partially molded by the first mold part, and said first mold part is removed from each notch through the through-opening in the bottom of the notch during demolding.

* * * * *